United States Patent
Conley et al.

(10) Patent No.: US 8,192,654 B1
(45) Date of Patent: Jun. 5, 2012

(54) METHOD FOR PRODUCING AN EQUAL PITCH EXTRUDED LENTICULAR SHEET

(75) Inventors: Kenneth E Conley, Matthews, NC (US); Jeff Hendrick, Indian Trail, NC (US)

(73) Assignee: Micro Lens Technology, Inc., Indian Trail, NC (US)

( * ) Notice: Subject to any disclaimer, the term of this patent is extended or adjusted under 35 U.S.C. 154(b) by 623 days.

(21) Appl. No.: 11/876,314

(22) Filed: Oct. 22, 2007

(51) Int. Cl.
*B29D 7/01* (2006.01)

(52) U.S. Cl. ..................................... 264/1.34

(58) Field of Classification Search .............. 264/2.5, 264/619, 900, 455, 1.34
See application file for complete search history.

(56) References Cited

U.S. PATENT DOCUMENTS

| | | |
|---|---|---|
| 4,414,316 A | 11/1983 | Conley |
| 4,420,502 A | 12/1983 | Conley |
| 4,420,527 A | 12/1983 | Conley |
| 6,995,914 B1 * | 2/2006 | Conley et al. ............. 359/619 |
| 2004/0136079 A1 | 7/2004 | Goggins |
| 2005/0286134 A1 | 12/2005 | Goggins |

OTHER PUBLICATIONS

David E. Roberts; History of Lenticular and Related Autostereoscopic Methods; 2003; Leap Technologies, LLC; Hillsboro, WI 54634, USA.

* cited by examiner

*Primary Examiner* — Larry Thrower
(74) *Attorney, Agent, or Firm* — Jason S. Miller; Lowndes, Drosdick, Doster, Kantor & Reed, P.A.

(57) ABSTRACT

Disclosed herein is a method for producing a lenticular sheet comprising the steps of providing a substrate of transparent material having a first side and a second side; and engraving a cylinder with an inverse lens pattern, the inverse lens pattern being comprised of a plurality if inverse lenticule shapes, each inverse lenticule shape having an incremental pitch relative to the others; and using the engraved cylinder in an extrusion embossment process such that the substrate can be embossed with the inverse lens pattern, wherein the lenticular sheet produced comprises a lens pattern having a plurality of lenticules each of a uniform pitch relative to one another.

10 Claims, 1 Drawing Sheet

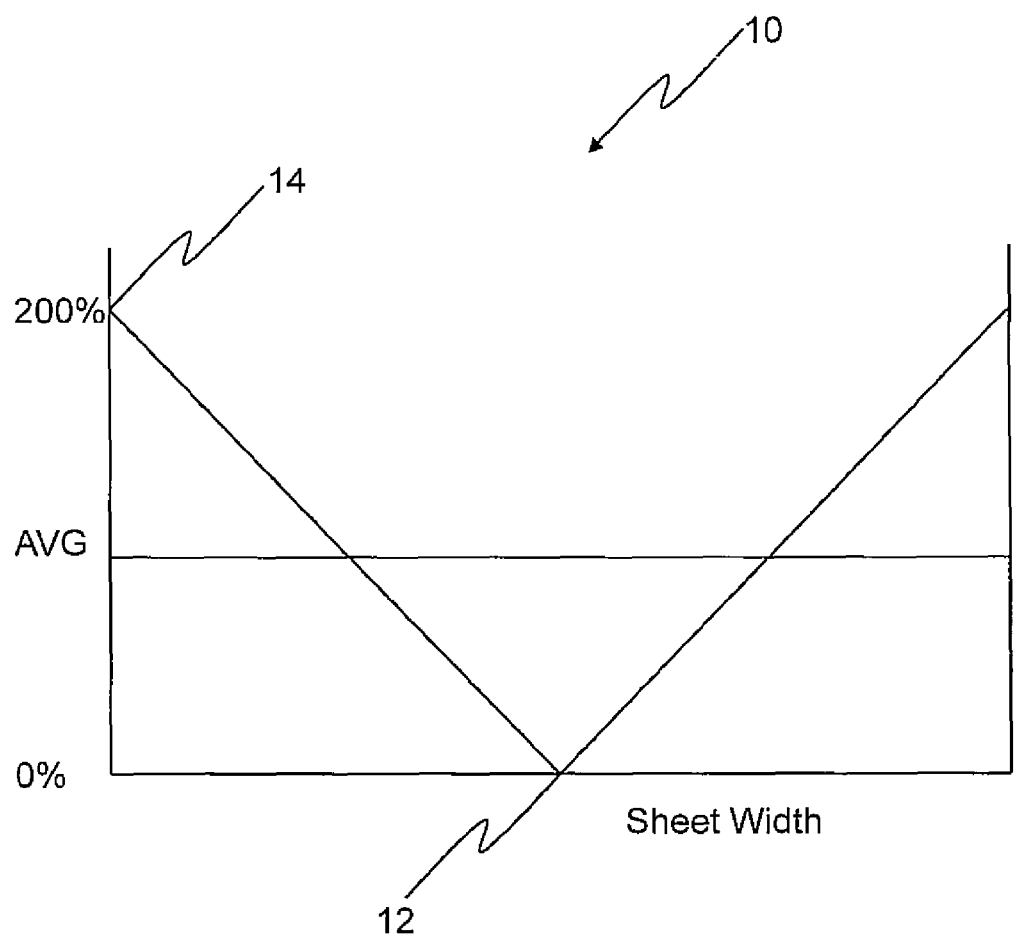

METHOD FOR PRODUCING AN EQUAL PITCH EXTRUDED LENTICULAR SHEET

BACKGROUND OF THE INVENTION

1. Field of the Invention

The present invention relates generally to methods and apparatus for producing lenticular sheets products, and more specifically, in an exemplary embodiment, to a manufacturing method for producing an extruded lenticular sheet having lenticules of substantially equal pitch.

2. Technical Background

In the commercial industry it is often desirable to impart visual effects such as three dimensionality or motion characteristics upon packages, labels, advertisements, entertainment devices, etc. Due to expense and ease of design, regular print was the pre-eminent and preferred form used on consumables and the like. Regular print is accomplished by printing two dimensional, non-movable information using words and graphics on packaging, labels, magazines, newspapers, brochures, fliers, posters, billboards, signs, etc. While some conventional print media are interesting, most are not. By way of example, the primary purpose for good print advertisements in packaging is to attract the attention of the reader or customer and convey the desired information. Unfortunately, many printed signs, advertisements and packages do not attract the attention of the desired audience or customers. As such, the use of products having lenticular effects has become increasingly popular.

Conventionally, lenticular lenses, or micro lenses, as used in imaging are typically elongated, lineal or dot patterned across an entire transparent sheet or web such that an image may be seen there through with the desired visual effect. The lenses can be either convex or concave in configuration. In addition, some lenses can be elliptical in shape. Other lens shapes or profiles are also possible (e.g., pyramidal, trapezoidal, parabolic, and the like). Desirably, the lenses have a pre-determined radius of curvature and a predetermined uniform or substantially equal pitch or repeat pattern. Lenticular lenses are thin, transparent lenses that are flat on one side and include a plurality of parallel, linear, side by side lenticules—elongate, convex ore concave lenses—on one side. Typically, an image is printed on the flat side to create a visual effect on the opposing side. The combination of the lenses and an image is referred to as a "lenticular assembly."

In many cases, prior art lenticular assemblies and lenticular lenses are manufactured and produced in a continuous web with the lenticules being parallel to the longitudinal or latitudinal axis of the entire web. Manufacturing lenticular lenses is a highly specialized process. In conventional methods of manufacture, a thermoplastic resin material can be extruded onto a transparent pre-produced sheet or web (i.e., a film), and the lenticular lens pattern embossed into the resin by an embossing roll. More commonly, lenticular lenses are manufactured or produced using a machine or system which includes an extruder and a plurality of longitudinally stacked rollers that are used to move and support the sheet. It will be understood by those skilled in the art that conventional systems use three stack rollers, two of which are positioned one over the other, with the third roller disposed intermediate the first two rollers. In such systems, the first or upper roller and the second or lower roller usually have smooth outer surfaces. The intermediate roller is typically a lenticular pattern-forming device (e.g., an engraved cylinder) which includes a groove pattern on its outer surface. When a sheet or film is pressed against the groove pattern, a plurality of lenticular lenses or lenticules, which make up a lenticular pattern or array, are formed on a surface of the plastic sheet. In this way, a lenticular pattern is formed in the sheet or web that corresponds to the groove pattern. Accordingly, to meet the increasing needs of high quality lenticular lenses, it is necessary to design and fabricate an accurate, high quality lenticular pattern-forming device—cylinder.

Methods and apparatus for engraving cylinders with a negative or inverse lens patterns and other patterns are known in the art. In one such example, inverse lens patterns or shapes are engraved on a precision engraving and diamond turning machine into special metal cylinders and polished to a high luster. Conventionally, lenticular sheets have been produced by an extrusion/embossment process in the system described above using these cylinders. Typical thickness of extruded sheets or webs varies from about 0.007 inches to over 0.250 inches. Lenticular sheet widths up to 52 inches and more are capable and Lens Per Inch (LPI) patterns ranging from 10 to 300 are popular, however, any LPI pattern is possible. It will be understood by those skilled in the art that there are other methods of producing lenticular sheets using the same engraved cylinders, such as heat embossing and UV casting. Unfortunately, heat embossing does not always give an accurate method of reproducing the lens shape engraved in the cylinder. Casting a UV resin onto the engraved cylinder and curing the same with a strong UV light will give the most accurate method of reproducing the lens shape, but is a slow and expensive production method. The casting method is also limited to a thinner sheet (~0.020 in. thick or less), unless it is laminated to a thicker clear sheet.

Disadvantageously, producing lenticular sheets or webs through the extrusion/embossment process on an extrusion machine does not have the accuracy of the casting method. It is commonly known that lenticular sheets and webs manufactured through an extrusion/embossment process will be heated to extreme temperatures to create a fluid suitable to form or mold. After the sheets or web exit the extrusion die, the thermoplastic resin will cool during the sheet forming process by coolant circulated through the rolls (extrusion nip) used to form the sheets. Afterwards, the thermoplastic sheet will continue to cool to ambient temperature of the manufacturing environment as it is pulled from the extrusion nip to end of the extrusion machine where cutting, sheeting or rolling is performed before packaging the product. As the plastic cools to room temperature, it will shrink in size based on its coefficient of thermal expansion/contraction along with the amount of tension applied during manufacturing. To provide proper cooling and produce a flat, commercially desirable sheet, an extrusion machine must be at least 40-100 ft in length. Disadvantageously, the pulling and cooling action over the length of the extrusion line produces a shrinkage, or 'necking', of the sheet or web.

The shrinkage or necking is shown by the unequal pitch of the plurality of lenticules across the sheet or web. As is known in the art, the overall pitch of a lenticular sheet is measured with a 'pitch test'. A pitch test is a series of printed bars equally spaced across the width of the sheet. By way of example, one set of bars would be at a spacing equivalent to 20 LPI, the next row of bars at 20.01 LPI, and so on. By laying the clear lenticular sheet on the printed pitch test, one can determine which row of bars creates a solid color across the entire width of the image. This provides the average pitch that would be used to generate the interlaced image. If the overall image width is narrow, approximately 22 inches or less, this method has worked very well. As the width increases and the number of interlaced base images increases, the miss-registration of any interlaced image lines to the lenticular lines is more apparent. For manufactured lenticular sheets, the pitch at the center of the web more closely resembled the pitch of the engraved cylinder. The pitch thereafter incrementally decreased from the center lenticule to the outer lenticules at either web edge. Therefore, as you move from the center outward, the corresponding pitch of the each successive lenticule decreases. It has been found that the shrinkage is typically on the order of approximately one percent (1%) minimum and can be more. The amount of shrinkage depends on many factors such as pulling tension, cooling temperature, speed, through put per hour, web or sheet thickness, web or sheet width, make of extrusion/embossment machine, and length of extrusion line.

Another disadvantage of conventional systems, is that printing devices and printing presses as well as plate making equipment all operate in a linearly and uniform spacing fashion. The pixel layout on a computer is also configured in a uniform spacing arrangement. Programs like Photoshop®, CorelDraw®, etc. that are sometimes used to interlace images are likewise laid out in a continuous and uniform fashion. Various software programs designed to process or interlace the multiple images of 3-dimensional composite have likewise been designed in the same linearly and equal fashion. There have been attempts to correct the non-uniformity described above and increase in spacing across the extruded lenticular sheet by applying defined algorithms to the interlacing software. The result has been an undesirable increase in banding seen in the print. This is a condition that arises from the fact that each pixel on the computer is of equal size and the software is presenting unequal lines to the computer. The computer makes an adjustment which shows up as banding in the print.

In addition, cylinders are typically engraved at normal room temperatures and are run on the extruder at typically 160 to 180 degrees Fahrenheit. Understanding that the cylinders are metal and have a coefficient of heat expansion; that disadvantageously adds to non uniform spacing from the center to both sides of the cylinder.

Accordingly, there is a need for an improved method of manufacture for extruded lenticular sheet and web products. In one such solution, it would be desirable to have an engraved lenticular cylinder which includes spaced intervals that take into consideration the required shrinkage of an extrusion machine that will give a finished sheet of uniform and constant lens spacing. In another such solution, it would also be desirable to have an improved method of manufacture which includes the provision of a lenticular pattern-forming device (e.g., an engraved cylinder) which overcomes the noted shortcomings of conventional devices. In another such solution, it would be desirable to provide an improved engraved cylinder which has a reverse lens pattern thereon which is operable for producing a lenticular sheet with an array of lenticules having a substantially equal pitch. In such a solution, the engraved cylinder would have a reverse lens pattern comprised of a plurality of lenticules patterns, each with a variable pitch such that shrinkage caused by the extrusion process is compensated for.

SUMMARY OF THE INVENTION

The present invention is designed to overcome the deficiencies and shortcomings of the devices described above. The present invention is designed to provide uniformity amongst the pitch of the lenticules which comprise a lenticular sheet of web product. In all exemplary embodiments, the present invention relates to an improved method of manufacture for lenticular sheets or webs which advantageously eliminates lenticules having an unequal pitch across the sheet or web. In all exemplary embodiments, the cylinder is engraved with an inverse lens pattern or array comprised of a plurality of lenticules having incremental or varying pitches, such that the extruded embossed lenticular sheet or web will yield lenticules having a uniform or substantially equal pitch.

In one exemplary embodiment, a method of providing uniformity of pitch amongst lenticule shapes of an extruded lenticular sheet comprising the steps of providing a substrate of transparent material having a first side and a second side and an index of refraction greater than one; and engraving a cylinder with an inverse lens pattern, the inverse lens pattern being comprised of a plurality if inverse lenticule shapes, each inverse lenticule shape having an incremental pitch relative to one another; and using the engraved cylinder in an extrusion embossment process to emboss the inverse lens pattern onto the substrate to produce a lenticular sheet, wherein the lenticular sheet produced includes a plurality of lenticule shapes, each lenticule shape having a substantially equal pitch relative to one another. The incremental pitch of each lenticule shape is determined by the steps of determining the total shrinkage across the lenticular sheet to be produced; determining the total number of lenticules to be engraved across the width of the cylinder; determining the average shrinkage per lenticule; determining the incremental pitch of each inverse lenticule to be engraved by using the formulas:

$$p_{e[n]} = p_s + 2s_{avg} - (n-1) * 2s_{avg} / ((L_s/2) - 1)$$

where n=1 to $L_s/2$, and $$p_{e[n]} = p_s + ((n - L_s/2) - 1) * 2s_{avg} / ((L_s/2) - 1)$$

where n=$L_s/2 + 1$ to $L_s$.

In another exemplary embodiment, a method of compensating for the shrinkage of the lenticular sheet or web as is moves through the manufacturing system is provided as well as the a method of compensating for the heat expansion of the cylinder while it is being engraved. Accordingly, the method of engraving the cylinder includes the steps of determining the expansion of the cylinder during the engraving process and compensating for the expansion by altering the depth and width of the engraved inverse lens pattern.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which:

FIG. 1 is a graph representing the sheet shrinkage across a lenticular sheet constructed in accordance with known methods.

DETAILED DESCRIPTION OF EXEMPLARY EMBODIMENTS

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

In the exemplary embodiments described below, a method for manufacturing or producing an extruded optical lenticular sheet or web comprised of a plurality of lenticules, each lenticule having a substantially equal pitch is provided. Advantageously, the method provided includes an engraved cylinder having a plurality of grooves (inverse lenticules forming an inverse lens pattern) engraved thereon, said grooves having varying pitches from the center outward and said cylinder being operable for use with an extrusion embossing process for the manufacture of lenticular sheets or webs.

The various embodiments of the present invention may be used with any lenticular manufacturing system. As is well known and understood in the art, lenticular material utilizes rows of simple and commonly dome-shaped lenses or lenticules in combination with a lineform or interlaced image, to create the desired visual effect. As used herein, the term "lenticular sheet or web" is intended to include any optical sheet, roll, film, or material that is suitable for use in the printing arts and has a substantially transparent quality. Material compositions of such sheets may include, for example and without limitation, plastics, thermoplastics, polypropylene, polyester, polyethylene, polyvinylchloride, vinyl, polyethylene terephthalate, polycarbonate, acrylic, polyolefin and polystyrene. All such compositions are considered to be polymeric and are synonymous therewith. In one example, the lenticular sheet generally comprises a flat side and a lenticulated side including the lenticules. An image is affixed, or reverse printed, to the flat side of the sheet thereby allowing a viewer to see the desired visual effect from the lenticulated side. The resulting product is a lenticular assembly that provides the advantages of the prior art without the shortcomings.

In exemplary embodiments, a cylinder is engraved according to a conventional method, either spiral engraving (screw-thread) or index (step and repeat) engraving, with a negative or inverse lenticular lens pattern or arrays where the pitch, or width, of the repeat pattern varies across the cylinder face. In accordance with one exemplary embodiment of the present invention, the lenticular sheet used is fabricated first by designing a cutting tool, such as a stylus, with a desired lens shape. The cutting tool is preferably made of a diamond or carbide, however, it will be understood by those skilled in the art that any hard material suitable for engraving cylinders may be used. The shape of the cutting tool is dictated by the desired visual effect by having a radius formed at the distal end thereof. Once the cutting tool is designed, the inverse lens shape is engraved into pre-selected portions of a cylinder using one of the known conventional methods of engraving, thereby forming a plurality of lens arrays or patterns. Preferably, the engraving process includes the use of a computer operable for directing the cutting tool in both direction and depth such that an optimal lens pattern can be transferred into the plate or cylinder.

As described above, conventional extrusion embossing manufacturing methods utilize engraved cylinders having an inverse lens pattern thereon, the lens pattern being comprised of a plurality of inverse lenticules, each lenticule having an equal or uniform pitch. This disadvantageously results in a percent of shrinkage amongst the pitch of each lenticule in the form of a "neck." In turn, an undesirable lenticular sheet or web is produced. In order to compensate for the subsequent shrinkage of the sheet or web during the extrusion embossing process, a variable or incremental inverse lenticule pitch must be engraved in to the cylinder. The variable pitch of each inverse lenticule will, in turn, produce a lenticular sheet or web having a plurality of lenticules, each with a substantially equal or uniform pitch.

In exemplary embodiments, each successive lenticule is incrementally increased or decreased in pitch. In other exemplary embodiments, the pitch is incrementally increased or decreased periodically or every X number of lenticules. In some applications, the periodic increase or decrease in pitch is not constant. By way of example, in applications for applying a lenticular sheet to a curved surface, such as a cup, the incremental changes in pitch will vary. The resultant will be a curved or substantially round surface having a visual effect of a flat image.

In order to compensate for the shrinkage caused by the extrusion embossment process, the desired, incremental pitch of each lenticule must be determined. To determine this incremental pitch, the total shrinkage (S) across the sheet, or the shrinkage percentage across the sheet, for a particular manufacturing line or extrusion/embossment machine must be determined. In addition, the total number of lenticules ($L_s$) across desired width ($w_s$), and desired pitch ($p_s$), or $LPI_s$ ($1/p_s$), of the lenticular pattern must be determined. To achieve these required values, the total shrinkage is defined as the difference between the width of the physically engraved pattern and the width of the pattern in the extruded sheet.

$$S = w_e - w_s$$

The total number of lenticules ($L_s$) of the desired pattern can be calculated by multiplying the desired LPI, by the desired pattern width or by dividing the desired width by the desired pitch.

$$L_s = LPI_s * w_s$$

Or $$L_s = w_s / p_s$$

The average shrinkage per lenticule ($s_{avg}$) can be calculated by dividing the total shrinkage by the total number of lenticules.

$$s_{avg} = S / L_s$$

As will be appreciated by those skilled in the art, shrinkage varies across the width of the engraved pattern. Referring now to FIG. 1, a graph 10 is depicted showing the sheet shrinkage across a typical lenticular sheet manufactured by a conventional extrusion embossment method. As shown, the center of the pattern exhibits little to no shrinkage 12 while the outer edges exhibit the most shrinkage 14. Also as shown, the shrinkage is linear from the center of the pattern to the outer edges, thus a shrinkage percentage ranging from 0% (of average shrinkage) at the center of the extruded sheet to 200% (of average shrinkage) at the outer edge of the extruded sheet is yielded.

To compensate for the sheet shrinkage, the inverse lenticular pattern needs to be engraved with a variable or incremental pitch larger than the desired pitch on the outer edges and similar to the desired pitch in the center of the roll. Thus, for each lenticule 1 to $L_s$, the corresponding engraved pitch is:

$$p_e = p_s + \Delta P_n$$

where n=1 to $L_s$. For lenticules 1 to $L_s/2$, $\Delta P_n$ must incrementally decrease the engraved pitch. $\Delta P_n$ is thus defined as:

$$\Delta P_n = 2s_{avg} - (n-1)*2s_{avg}/((L_s/2)-1)$$

where n=1 to $L_s/2$. For lenticules $L_s/2+1$ to $L_s$, $\Delta P_n$ must incrementally increase the engraved pitch. $\Delta P_n$ is thus defined as:

$$\Delta P_n = ((n-L_s/2)-1)*2s_{avg}/((L_s/2)-1)$$

where n=+$L_s/2+1$ to $L_s$. By combining the formulas listed above, the variable or incremental pitch formulas based on a linear shrinkage are:

$$p_{e[n]} = p_s + 2s_{avg} - (n-1)*2s_{avg}/((L_s/2)-1)$$

where n=1 to $L_s/2$ and:

$$p_{e[n]} = p_s + ((n-L_s/2)-1)*2s_{avg}/((L_s/2)-1)$$

where n=$L_s/2+1$ to $L_s$.

The method described above assumes a linear shrinkage across the lenticular pattern. Depending on the extrusion embossment equipment and its setup, the shrinkage could not only be linear, but could be exponential or based on any other algorithm.

In addition to the forgoing, other exemplary embodiments of the present invention provide for a method of compensating for the shrinkage of the lenticular sheet or web as is moves through the manufacturing system as well as the manufacture of the cylinder itself. Indeed, the cylinder, similar to the lenticular sheet or web, will expand and contract with temperature. Typical temperatures during the engraving process may approach 75 degrees Fahrenheit. Typical temperatures during the extrusion embossment process may approach 200 degrees Fahrenheit. The amount of expansion seen by the cylinder simply due to the change in temperature would be:

$$EPI = \Delta T * \alpha$$

Using the values listed above and the coefficient of expansion for a typical metal/steel cylinder (6 μin/in-F), an expansion of 0.00075 in. per in of engraved area is found. For an engraved area of 50 inches, a total expansion of 0.0375 in is determined. Therefore, this added expansion due simply to the change in temperature from engraving to extrusion may also be considered in the manufacture of the lenticular sheet or web.

Subsequent to the engraving of the cylinder, the cylinder is placed into the lenticular system or process of manufacture. The inverse lens pattern is then transferred to a sheet material using known conventional extrusion embossment methods, thereby forming the lens pattern on the sheet in desired areas. As the sheet or web moves through the system and begins to cool and shrink from the extrusion/pulling, the resulting sheet or web product will have a plurality of lenticules, each lenticule having a substantially equal or uniform pitch to the others. Subsequent to the formation of the lenticular sheet or web, a stripped image array is produced by a thermal or piezoelectric ink jet printer that is readily capable of producing 1200 picture elements per inch and laminated or otherwise affixed to the flat side of the lenticular sheet such that the image location and direction corresponds to the lens array location and direction. Another option for directly printing a reverse image on the sheet is screen-printing which is an option for array resolutions of greater than 10 elements per inch up to about 60 elements per inch. The printing medium may be plastic, thermoplastic, or paper. Preferably, the printed array has the same frequency as the lens array, such that a print that contains multiple image information can be linearly registered to the lens.

The embodiments described above provide advantages over conventional lenticular assemblies and associated methods of extrusion embossment manufacture. By way of example, by producing a lenticular sheet or web with constant spacing across the full width enables the use of current interlacing software, computer programs, plate making equipment and printing equipment which all operate with a linear and uniform spacing.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Furthermore, the foregoing description of the preferred embodiment of the invention and best mode for practicing the invention are provided for the purpose of illustration only and not for the purpose of limitation—the invention being defined by the claims.

What is claimed:

1. A method of producing an extruded lenticular sheet having a uniform pitch comprising the steps of:
   providing a substrate of transparent material having a first side and a second side and an index of refraction greater than one; and
   forming a plurality of lenses on the first side of the substrate,
   wherein each lens of the plurality of lenses has a pitch that is substantially equal to the remainder of the plurality of lenses, said substantially equal pitches being produced by determining the total shrinkage across the lenticular sheet to be produced; determining the total number of lenticules to be engraved across the width of the cylinder; determining the average shrinkage per lenticule; determining the pitch of each inverse lenticule to be engraved, inverse engraving a variable and incremental lens pattern into an engraving cylinder from which the lenticular sheet having the substantially equal pitch lenses is produced, and producing the lenticular sheet having the substantially equal pitch lenses from the engraved cylinder.

2. The method of claim 1, wherein the step of forming the plurality of lenses further comprises the steps of:
   using the engraving cylinder in an extrusion embossment process such that the substrate can be embossed with the inverse lens pattern.

3. The method of claim 2, wherein the step of engraving the cylinder further comprises the steps of:
   utilizing a computer to control and direct the direction and depth of the engraved lens pattern.

4. The method of claim 1, wherein the plurality of lenses comprises two or more different types of lens patterns.

5. The method of claim 1, wherein said sheet can be reverse printed by lithography, gravure, flexography, ink jet or screen.

6. The method of claim 1, wherein said substrate can be produced from any material selected from the group consisting of plastics, thermoplastics, polypropylene, polyester, polyethylene, polyvinylchloride, vinyl, polyethylene terephthalate, polycarbonate, acrylic, polyolefin and polystyrene.

7. The method of claim 2, wherein the step of engraving the cylinder includes the steps of determining the expansion of the cylinder during the engraving process and compensating for the expansion by altering the depth and width of the engraved inverse lenses pattern.

8. The method of claim 2, wherein the incremental pitch plurality of inverse lenses is changed periodically.

9. A method of providing uniformity of pitch amongst lenticule shapes of an extruded lenticular sheet comprising the steps of:

provinding a substrate of transparent material having a first side and a second side and an index of refraction greater than one; and engraving a cylinder with an inverse lens pattern, the inverse lens pattern being comprised of a plurality if inverse lenticule shapes, each inverse lenticule shape having an variable and incremental pitch relative to one another such that each inverse lenticule shape will produce a lenticule having a substantially equal pitch to other lenticules produced from the inverse lens pattern; and using the engraved cylinder in an extrusion embossment process to emboss the inverse lens pattern onto the substrate to produce a lenticular sheet, wherein the variable and incremental pitch of each inverse lenticule shape engraved is determined by the steps of determining the total shrinkage across the lenticular sheet to be produced; determining the total number of lenticules to be engraved across the width of the cylinder; determining the average shrinkage per lenticule; and determining the variable and incremental pitch of each inverse lenticule to be engraved to ensure that the pitch of the lenticules produced are substantially equal.

10. The method of claim 9, wherein the step of engraving the cylinder includes the steps of determining the expansion of the cylinder during the engraving process and compensating for the expansion by altering the depth and width of the engraved inverse lens pattern.

\* \* \* \* \*